United States Patent [19]
Burdick

[11] 3,923,165
[45] Dec. 2, 1975

[54] DEVICE FOR TRANSLATING AND ROTATING A ROCKET MOTOR OR THE LIKE

[75] Inventor: Robert E. Burdick, Santa Barbara, Calif.

[73] Assignee: Rolair Systems, Inc., Santa Barbara, Calif.

[22] Filed: Oct. 1, 1973

[21] Appl. No.: 402,316

[52] U.S. Cl. .............................................. 214/1 BE
[51] Int. Cl. ............................................... B60v 1/00
[58] Field of Search ............... 214/1 Q, 1 QB, 1 BE; 302/19, 28; 198/218, 219; 180/124, 116

[56] References Cited
UNITED STATES PATENTS

| | | | |
|---|---|---|---|
| 3,513,934 | 5/1970 | Crowley | 214/1 BE |
| 3,692,192 | 9/1972 | Baldur | 214/1 BE |
| 3,757,931 | 9/1973 | Baker et al. | 214/1 BE |

*Primary Examiner*—Stanley H. Tollberg
*Attorney, Agent, or Firm*—Harris, Kern, Wallen & Tinsley

[57] ABSTRACT

A support device for translating and rotating cylindrical objects such as large rocket motors, including a series of loadsupporting plates incorporating air bearings and attached to a common frame and warpable to closely conform to the curvature of the supported object. A plurality of such support devices positioned side by side. One or more drive units carried on a frame and engagable with the supported object for rotating the object.

5 Claims, 4 Drawing Figures

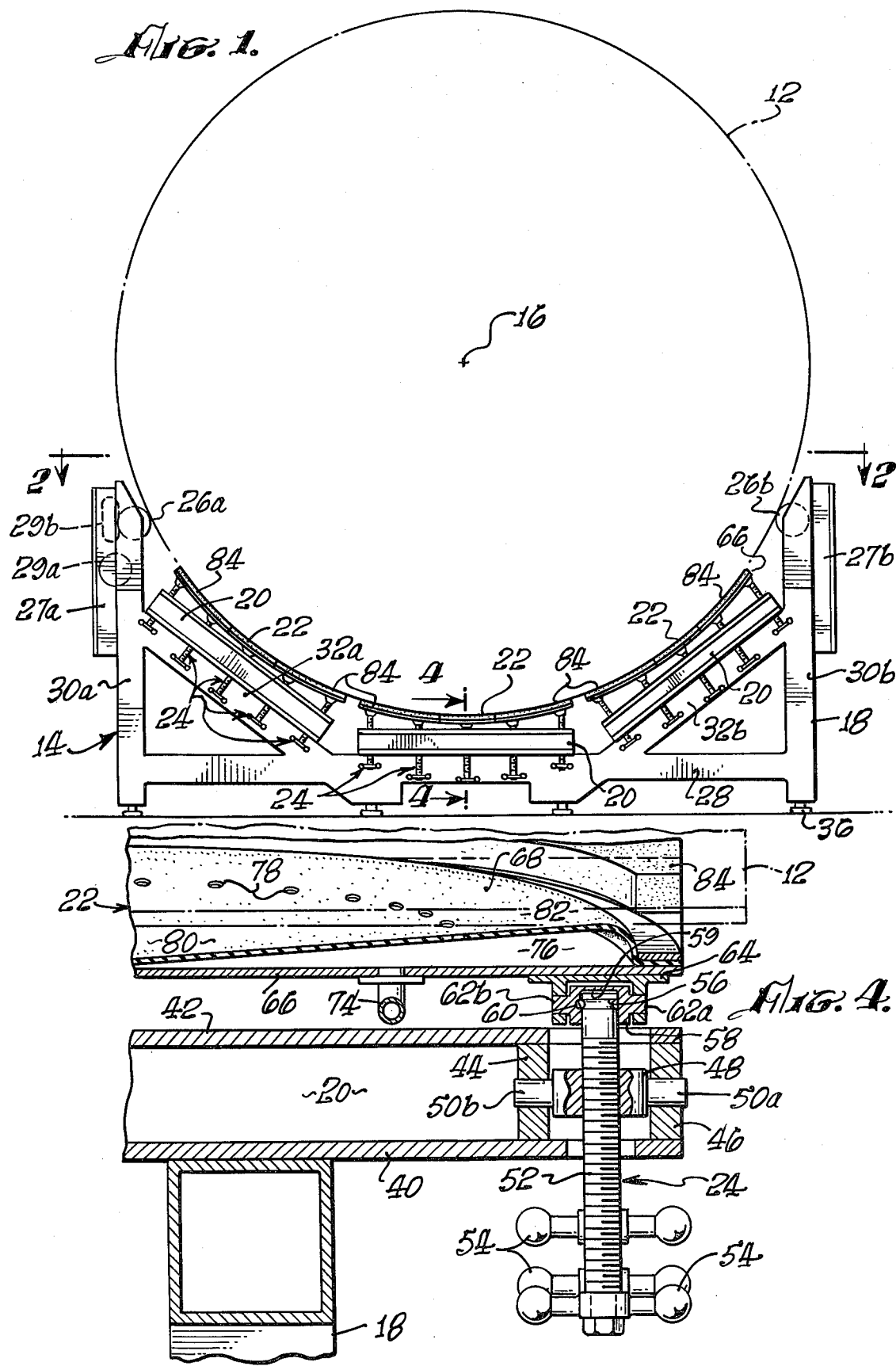

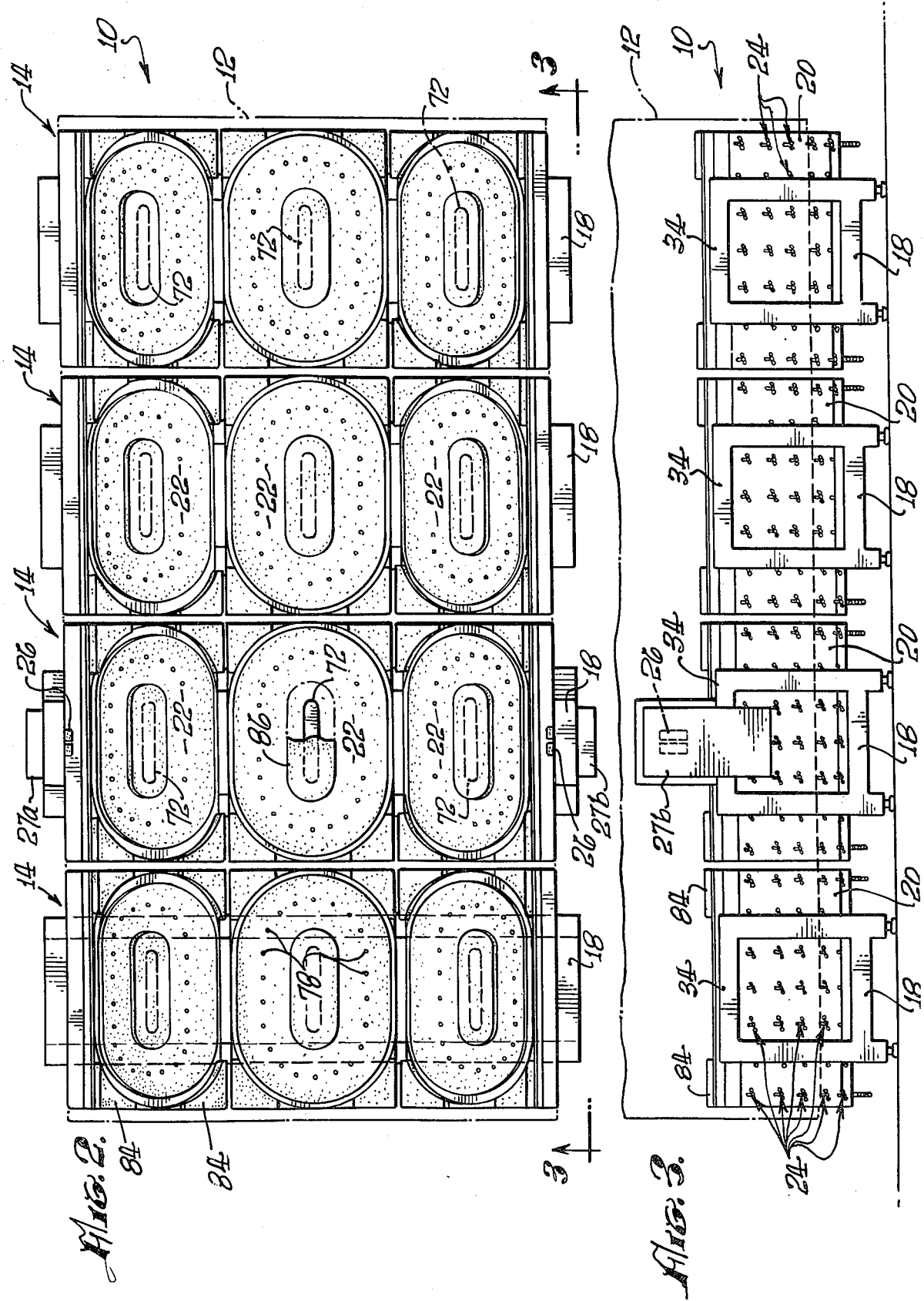

DEVICE FOR TRANSLATING AND ROTATING A ROCKET MOTOR OR THE LIKE

The present invention relates to support devices for supporting cylindrical objects in a horizontal orientation and particularly to means for supporting large cylindrical objects such as rocket motors and the like and providing for both translational and rotational repositioning of the supported object.

In the field of industrial handling equipment for the support and movement of large cylindrical objects while in a horizontal orientation, it has long been the general practice to employ various types of open-ended cradle devices for support and prevention of unwanted movement.

Where movement of the cylindrical object relative to the cradle has been desired, various types of supportive roller devices have been affixed to the cradle for roller contact with the outer surface of a cylindrical object and thereby responsive to forces applied directly to the object. Such roller-equipped cradles may have the roller axes either parallel to the longitudinal axis of the cylindrical load or transverse thereto for accommodating rotation or translation of a load. Cradles commonly serve specialized functions and provide for only one direction of load movement. While roller cradles are widely used for many cylindrical objects, they have serious shortcomings when used to support cylindrical objects manufactured in accordance with procedures to minimize surface damage and flexing of the cylindrical object during handling.

Rollers inherently impart a moving line or area of stress concentration to the supported object. The magnitude, of course, is dependent upon factors such as the number of rollers to support the load, the roller diameter, and resiliency of the roller material. Foreign objects coming between the supported surface and the roller necessarily increase the point loading inherent to the roller and may cause severe damage to the surface of the supported object. When several cooperating rollers are required in a cradle support, the question of roller axis alignment becomes important when considering efforts to minimize scuffing or marring of the supported surface which occurs when the roller axes are not mutually parallel.

Relative to the handling of large cylindrical and highly precise structures such as those commonly found in the aerospace industry, an adaptation of the roller cradle principle has been utilized to overcome some of the previously mentioned shortcomings. In the main, this body of handling devices includes two or more encircling girth rings placed about the cylindrical body and having a padded surface in contact with the supported object. The outer surface of the ring then becomes a track for engaging the rollers of a supporting cradle and the the object and rings rotated as a unit. In this configuration, certain shortcomings of the previously mentioned roller cradles as related to load stresses and surface scuffing may be overcome. However, the ringtype cradle has its own shortcomings since it necessarily obscures a portion of the cylindrical object and renders it inaccessible for work or inspection procedures. And further, the ring although hinged for assembly around the object must be loosened to allow translation of the object.

Both the simple roller cradle and the ring and roller cradle of the type having roller axes parallel to the load share a common shortcoming in that other handling equipments are required to translate the cylindrical object along the cradle. Commonly, the translation of the cylindrical object relative to its cradle is accomplished by means of an overhead hoist and sling arrangement. Translation by this means becomes particularly cumbersome where only small translations are required such as in end-to-end mating together of two cylindrical sections. This cumbersomeness of the translational means is compounded in cases where small rotational displacements are also required. Similar problems arise where the cradle roller axes are located transverse to the longitudinal axis of the load and some amount of load rotation is required.

Accordingly, in view of the foregoing problems it is an object of the present invention to provide a stable support device for large cylindrical objects which engages a supported object over a broad area of its surface and thereby generates loading stresses not in excess of those allowable for the supported structure.

Another object of the present invention is to provide such a support device which not only provides for rotation of the cylindrical object but also its translation along the support device without the use of slings, cradles, and the like for temporarily uplifting the cylindrical object.

Still another object of the present invention is to provide such a supporting device which enables simultaneous rotation and translation of cylindrical objects without incurring abrasive sliding contact between surfaces of the cylindrical object and the support device.

A further object of the present invention is to provide a support device adaptive by simple adjustment to a range of cylinder diameters and of a modular nature whereby an assemblage of modules may be simply altered to accommodate cylindrical objects of varying length or the limits of the translational excursion while on the support device.

A still further object of the present invention is to provide such a support which when actuated for rotation and translation of the cylindrical object does not appreciably decrease the stability of the cylindrical object.

The foregoing objects and the exact nature of this invention as well as other objects and advantages thereof may be more clearly understood by reference to the following detailed description when considered with the drawings which, by way of example only, illustrate one form of a support device for cylindrical objects embodying the features of the present invention.

IN THE DRAWINGS

FIG. 1 is an end view of a support device incorporating the presently preferred embodiment of the invention, including, in phantom outline, a cylindrical object thereon;

FIG. 2 is a top view of the support device of FIG. 1 indicating its modular nature;

FIG. 3 is a side view of the support device taken from the line 3—3 in FIG. 2; and FIG. 4 is an enlarged partial sectional view taken along the line 4—4 of FIG. 1.

In the support device illustrated, a cradle 10 supports a cylindrical object 12 in a generally horizontal position. The cradle 10 includes a number of support devices 14 adjacently positioned and in alignment with a horizontal axis 16 in coincidence with the longitudinal axis of the cylindrical object 12. The support device 14 comprises a frame 18 having three pallet members 20 each arcuately positioned relative to the axis 16. Each pallet member 20 is an integral part of the frame 18 and in combination with the frame 18 forms a rigid base for an air bearing 22 which directs and controls a flow of pressurized air to produce an uplifting force against the cylindrical object 12 sufficient to "float" the cylindrical object on a thin film of escaping air. The principle of using an air bearing to float an object on a thin film of escaping air or other fluid is known, and typical air bearings are shown in U.S. Pat. Nos. 3,260,322 and 3,318,406 which apply to supportive air films in contact with flat surfaces. This is in contrast to the present invention which provides supportive air films for the support and movement of cylindrical objects. Air bearings are used to support loads on flat surfaces and are well suited to support and move extremely heavy loads such as industrial machinery, large parts, and assemblies of items in manufacture. The present invention is adaptable to support and move similarly large and cumbersome cylindrical objects such as spacecraft sections and rocket motors and particularly so where they contain high density solid propellants susceptible to damage by flexure and loadings attendant to earlier handling techniques. Quite typical of the rocket motors contemplated are those having cylindrical sections weighing more than 300,000 pounds, having a nominal diameter of 13 feet and lengths of about 24 feet. A completely assembled rocket motor may include three such sections in which case it is contemplated that three cradles as best shown in FIGS. 2 and 3 may be used in adjacent positions to support the assembled rocket motor over its entire length.

Each of the air bearings 22 of the present invention is retained on the supporting pallet 20 by a series of adjustment means 24 each independently adjustable and extending upwardly from pallet 20. By selective positioning of the adjustment means 24 the air bearing 22 may be warped to conform to the curvature of the supported object. In practice, a template of "dummy" of the object to be supported may conveniently be used to initialize a position of the adjustment means 24 and curavture of the air bearing 22. After having initialized the curvature of the air bearing 22 further refinement in the curvature may be made with the supported object in place to minimize losses of pressurized air.

The support device may include one or more drive units 27a, 27b carried on the frame 18, with drive wheels 26a, 26b, respectively, for engaging the load. The drive units may be conventional air operated devices, each including a motor 29a for rotating and braking the drive wheel as well as for locking the drive wheel in a stationary position. Each drive unit may also include spring means urging the drive wheel away from the load and an air powered cylinder 29b for urging the wheel into engagement with the load. Of course, many variations and combinations of mechanical, electrical, and pneumatic devices may be used. Depending upon the application, such a combination may include an electrical motor together with a pneumatic loadengaging means.

In more specific detail, and referring to FIGS. 1 and 4 of the drawing, the frame 18 may be an assemblage of hollow and tubular structural members having a generally square cross section. The frame 18 may more particularly be a weldment of such tubular members comprising a horizontal member 28 connecting vertical members 30a and 30b extending upwardly and located on opposing ends of member 28. Knee braces 32a and 32b extend upwardly from member 28 and tie near the top of vertical members 30a and 30b. Several horizontal cross ties 34 connect to identical assemblages of parts 28, 30, and 32 which are held in vertical position. An adjustable leveling leg 36 may be provided at the lower end of each vertical member 30a and 30b and in the center portion of horizontal member 28 to compensate for any sloping of or surface irregularities in a generally horizontal support surface 38. As shown in FIG. 1, the horizontal axis 16 is located above the midpoint of horizontal member 28 and is a reference line for the arcuate position of knee braces 32a and 32b. In the embodiment of the frame 18 as shown in FIG. 1, reference lines drawn normal to the center of knee brace 32a and 32b and intersecting axis 16 are displaced from vertical by approximately 38° thereby establishing the knee braces in a uniform relationship. A pallet 20 is supported on each pair of identically sloping knee braces 32a and 32b and on the central portions of horizontal members 28. The pallet members 20 may be conveniently included in the over-all weldment of the frame 18 and thereby contribute to its over-all strength and rigidity.

As best shown in FIG. 4, each pallet 20 has a bottom plate 40 supported on paired frame members 28, 32a, and 32b of frame 18. A top plate 42 is supported in a spaced-apart and superposed position over a bottom plate 40 by several pairs of parallel beams 44 and 46, each pair equidistantly spaced between opposing ends of plates 40 and 42 and astraddle the vertically appearing rows of adjustment means 24 as shown in FIG. 3. Each pair of beams 44 and 46 together with plates 40 and 42 form an elongated and box-like girder section located transverse to the direction of horizontal axis 16. As best shown in FIGS. 3 and 4, opposing ends of pallet 20 overhang the width of frame 18 as measured along horizontal axis 16. A series of spaced-apart holes are formed along a common axis extending through both bottom and top plates 40 and 42 respectively, and into each of the aforementioned girder sections thus providing clearance for the adjustment means 24 to extend both above and below the top and bottom plates 42 and 40 respectively of the pallet 20. Although not repeated in full detail it is to be understood that an adjustment means 24 as shown in FIG. 4 may be provided at the locations indicated in FIG. 3.

As best shown in FIG. 4, each pair of beam members 44 and 46 carries a threaded nut 48 suspended on a pair of trunions 50a and 50b having an axis generally parallel to the horizontal axis 16. A threaded shaft 52 engages the nut 48 and is hand-turnable therethrough by a handle 54 attached to the lower end thereof. An annular groove 56 is formed near the upper end of shaft 52. A retaining member 58 having a circular cavity receivable of the upper end of shaft 52 and annular groove 56 houses a retaining pin 60 to engage the annular groove 56. Thus, the shaft 52 is maintained in rotatable yet axially fixed contact with the retaining member 58. When supporting a load, the base of the cavity 59 and end of the shaft 52 are the primary load bearing surfaces. A pair of trunions 62a and 62b mount the retaining member 58 within a U-bracket 64 affixed to and opening downwardly from the underside of the air bearing 22.

The curved air bearing 22 of the present invention includes a base plate 66 of rectangular proportion most clearly shown in FIG. 2 and having a curvature conforming to the surface of the supported cylindrical object as best shown in FIG. 1. The base plate 66 carries an oval-shaped diaphragm 68 sealed at its edge to the base plate 66 by an overlaying ring clamp 70 firmly secured to the base plate by fasteners (not shown). A central portion of the diaphragm 68 is also held in contact against the base plate 66 by an overlaying hold-down plate 72 by fasteners (not shown). The diaphragm 68 as shown in FIG. 4 is in its extended or inflated position deforming upwardly in contact against the supported object 12 as in response to pressurized air.

The air bearing 22 may include an air fitting 74 for connection to a source of pressurized air for air flow into an annular chamber 76 formed around the centrally located holddown plate 72 and having the diaphragm 68 and portions of base plate 66 forming opposing walls thereof. Pressurized air admitted to the annular chamber 76 through air fitting 74 may then pass upwardly through each of a series of spaced-apart holes 78 formed in diaphragm 68. After passing through the holes 78 of diaphragm 68, air enters a pocket 80 formed between the surface of the supported cylindrical object and the upper surface of the diaphragm 68. The shape of the pocket is determined by the area of contact 82 between the peripheral area of the diaphragm 68 and the load of the cylindrical object 12 resting thereupon. As shown in FIG. 4, the area of contact 82 tends to prevent the outward flow of air from within the pocket 80.

The corner portions of each base plate 66 may be provided with a load supportive pad 84 formed of a high-density, closed-cell, deformably compliant material such as foam-rubber, vinyl, or urethane foam. A similar supportive pad 86 may also be provided in the center portion of the air bearing 22 positioned over the holddown plate 72. In the embodiment of my invention as shown, the pads 84 and 86 may be adhesively fixed in position and of a material having sufficient load bearing capacity to bear the entire load of the supported object in the absence of pressurized air. The pads may thus prevent load bearing contact between the ring clamp 70, the base plate 66, the holddown plate 72, and the surface of the supported object 12 thereby precluding damaging concentrated loading or marring of the surface of the supported object.

The support device of the present invention has two modes of operation; one as simply a support to prevent movement of the cylindrical object, in which case the load is supported on the pads 84 and 86; and two, the support of a cylindrical object to provide for its rotation or translation relative the horizontal axis 16 or for simultaneous rotation and translation.

As previously described, the area of contact 82 between the cylindrical object and the top surface of diaphragm 68 controls the loss of air from the pocket 80. The uplifting force imparted against the supported object is derived from the pressure of the air contained within the pocket 80 bearing against the surface bounded by the peripheral area 82. At air pressures above some limit air begins to flow between the diaphragm and supported object. The air pressure at which this air flow starts is dependent upon the weight of the load and the closeness with which the base plate 66 conforms to the curvature of the cylindrical object. With regard to the closeness of matching curvatures, the curved air bearing 22 of the present invention may be adjusted in curvature by the adjustment means 24 to very closely conform to the curvature of the supported object thereby minimizing the losses of pressurized air and to insure that the load is uniformly distributed over the peripheral area of contact 82. Having achieved a balance of air pressure and uniform flow, the supported object is then entirely supported on the film of moving air which inherently offers very little resistive force in opposition to movement of the supported object. While the supported object 12 is bouyantly supported on the thin film of moving air, translational movement along horizontal axis 16 may be accomplished by applying a force directly against the object 12. Additionally, rotational movement of the object 12 may be accomplished simultaneously with the aforementioned translational movement. Where predominantly rotational movement is required, the drive means 26a and 26b may be brought into contact against the outer surface of the cylindrical object and rotating in the same direction, will cause the cylindrical object 12 to be displaced accordingly. It may be desirable to have a forward as well as a reverse direction of rotation and a selectivity of speeds and control responsiveness. The object may be fixed in position by engaging the drive wheels with the object, with the drive motors in the braking or off condition.

From the foregoing detailed description, it is to be understood that the support device of the present invention is particularly well suited for the support of cylindrical objects such as large rocket motors where it is imperative that the integrity of the outer surface not be marred or be subjected to damagingly high or abruptly applied concentrated loading. It is to be further understood that the supporting device of the present invention enables simulataneous rotation and translation of cylindrical objects without incurring any appreciable contact since the object is supported on a moving film of air which inherently eliminates all sliding contact between fixed surfaces. The curved air bearing support of the present invention also provides for adjustment of curvature to closely conform to the curvature of the supported object.

While a particular form of a support device for a cylindrical object is described in some detail herein, it is appreciated that changes and modifications may be made in the illustrated form of the invention without departing from the spirit of invention. Accordingly, it is intended that the present invention be limited in scope only by the terms of the following claims.

I claim:

1. A device for supporting a cylindrical load for simultaneous translation and rotation, comprising:
    a frame for resting a horizontally extending surface and including means defining load-supporting surfaces positioned in a generally arcuate configuration relative to a horizontally extending axis located above said frame;
    a plurality of air bearings carried on said frame at said surfaces, each of said air bearings having a resilient and compliant diaphragm with a restrained center portion and an annular portion inflatably responsive to pressurized air passing through openings therein, and having a curvature generally conforming to the curvature of a cylindrical load for receiving and uplifting thereagainst; and adjustment means attached to said frame and said air bearings for changing the spacing therebetween.

2. A device as defined in claim 1 wherein said adjustment means includes a plurality of spaced-apart independently extensible and retractable supports for varying the curvature of said air bearings.

3. A device as defined in claim 2 wherein each of said supports includes:
   a threaded shaft;
   a nut mounted on said frame for receiving said threaded shaft;
   a plate mounted on the bottom of said air bearing rotatably receiving and retaining an upper end of said threaded shaft; and
   handle means carried at a lower end of said threaded shaft for turning said threaded shaft through said nut thereby changing the spacing between said air bearing and said frame.

4. A device for supporting a cylindrical load for simultaneous translation and rotation, comprising:
   a frame for resting on a horizontally extending surface and including means defining load-supporting surfaces positioned in a generally arcuate configuration relative to a horizontally extending axis located above said frame;
   a plurality of air bearings carried on said frame at said surfaces, each of said air bearings having a resilient and compliant diaphragm with a restrained center portion and an annular portion inflatably responsive to pressurized air passing through openings therein, and having a curvature generally conforming to the curvature of a cylindrical load for receiving and uplifting thereagainst; and
   drive means mounted on said frame for engaging and rotating the cylindrical load, said drive means including a drive wheel having an axis of rotation generally parallel to said horizontally extending axis and having a friction surface for bearing against the cylindrical load thereby rotating the cylindrical load about said horizontally extending axis in response to movement of said friction surface.

5. A device for supporting a cylindrical load for simultaneous translation and rotation, comprising:
   a frame for resting on a horizontally extending surface;
   a plurality of pallet members attached to said frame in arcuate position relative to a horizontally extending axis located above said frame;
   a plurality of spaced-apart independently extensible and retractable adjustment means seated on each said pallet member;
   a plurality of air bearings each having a flexible base plate captively connected to and supported by a plurality of said adjustment means and responsive to the displacement of said adjustment means for conforming to the curvature of the cylindrical load and having a resilient and compliant diaphragm on top thereof with a peripheral band in sealed contact and forming a chamber therewith and having communication with a source of pressurized air, said diaphragm having holes extending therethrough for passage of said pressurized air and for receiving and supporting the cylindrical load and forming a sealed cavity with the outer surface thereof thereby preventing the flow of said pressurized air until the pressure of said pressurized air increases sufficiently to escape from said cavity thereby providing support of the cylindrical load on a thin film of escaping air.

* * * * *